United States Patent Office 3,776,929
Patented Dec. 4, 1973

3,776,929
PHOSPHINITE, PHOSPHONITE, THIOPHOSPHI-
NITE, AND DITHIOPHOSPHONITE COM-
POUNDS OF PALLADIUM AND PLATINUM
Joseph J. Mrowca, Wilmington, Del., assignor to E. I. du
Pont de Nemours and Company, Wilmington, Del.
No Drawing. Filed Oct. 18, 1971, Ser. No. 189,834
Int. Cl. C07f 15/00, 15/04
U.S. Cl. 260—429 R     20 Claims

ABSTRACT OF THE DISCLOSURE

Disclosed herein are compounds having the formula $(L)_2MXY$, wherein (L) is a phosphinite, phosphonite, thiophosphinite, or dithiophosphonite ligand, M is Pd or Pt and X and Y are alike or different and are selected from chlorine, bromine, iodine, various substituted and unsubstituted alkyls and aryls, cyano, $SnCl_3$, isocyanato, thiocyanato, aroyl and lower perfluoroalkyl groups. The process involves reacting one equivalent of a source of MXY with two or more equivalents of a selected phosphorus-containing ligand. The products are useful in the alkoxycarbonylation of olefins and in the polymerization of acetylene.

FIELD OF THE INVENTION

This invention is concerned with novel phosphinites, thiophosphinites, phosphonites and dithiophosphonites of platinum and palladium.

SUMMARY OF THE INVENTION

The novel compounds have the structural formula $$(L)_2MXY$$

wherein:
L is selected from one of

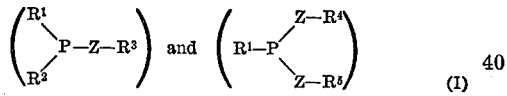
(I)

M is Pd or Pt,
X and Y are alike or different and are selected from chlorine, bromine, iodine, alkyl up to 5 carbons, cyano, $SnCl_3$, alkanoyl of 2–5 carbons, aroyl of up to 12 carbons and, when X does not equal Y, one of X and Y can be hydrogen.
Z is O or S,
$R^1$, $R^2$, $R^3$, $R^4$ and $R^5$ are selected from linear or branched alkyl of up to 10 carbon atoms, aryl of up to 12 carbon atoms, substituted aryl of up to 12 carbon atoms containing up to 5 lower alkyl or lower alkoxy groups, each containing up to 4 carbon atoms, up to 5 halogen atoms, up to 3 cyano groups, up to 3 alkoxycarbonyl or up to 3 trifluoromethyl groups, aralkyl of up to 12 carbon atoms, and alkaryl of up to 12 carbon atoms, $R^4$ and $R^5$ taken together can be o-arylene or $-(CH_2)_n-$ where $n=$ 2 or 3.

The novel process comprises reacting a source of MXY, wherein M, X and Y are as heretofore defined, with 2 or more equivalents of a phosphonite, dithiophosphonite, phosphinite, or thiophosphinite ligand. The source of MXY can be (1) MXY itself, (2) $Z^1{}_2MXY$, or (3) $Z^2MXY$ wherein $Z^1$ is a monodentate labile ligand such as benzonitrile, dimethylphenylphosphine, acetonitrile, etc., and $Z^2$ is a bidentate labile ligand such as dicyclopentadiene, 1,5-cyclooctadecadiene, 1,5-hexadiene, cyclooctatetraene, norbornadiene, and the like.

The process proceeds as follows depending on the source of MXY:

$2(L) + MXY \rightarrow (L)_2MXY$
$2(L) + Z^1{}_2MXY \rightarrow (L)_2MXY + 2Z$
$2(L) + Z^2MXY \rightarrow (L)_2MXY + Z^2$ All reactions will proceed at ambient temperature or higher in a solvent which can be selected from chloroform, methylene chloride, benzene, benzonitrile, acetonitrile, and other lower alkyl cyanides. Reactions of ligands with platinous and palladous halides are slow and may require extended periods of time for completion. For instance, periods of up to 24 hours or more may be necessary. In the case of a ligand of low reactivity, warming can be employed to increase the rate of the reaction. The reactions in which labile ligands are displaced are generally complete in about 10 minutes to 1 hour but may require up to 24 hours.

DETAILS OF THE INVENTION

Preferred phosphorus-containing ligands (L) which have the structure,

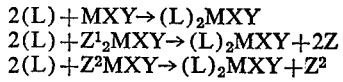
(II)

(wherein $R^1$, $R^2$, $R^3$ and Z are as heretofore defined) include:

(1) $(C_6H_5)_2$—P—$OC_6H_5$
(2) $(C_6H_5)_2$—P—$OCH_3$
(3) $(C_6H_5)_2$—P—$OC_2H_5$
(4) $(C_6H_5)_2$—P—O—$C_4H_9$ (normal)
(5) $(C_6H_5)_2$—P—S—$C_6H_5$ Preferred ligands (L) of the structure,

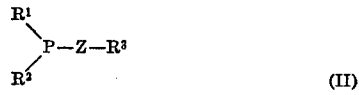
(III)

(wherein $R^1$, $R^4$, $R^5$ and Z are as heretofore defined) include:

(6) $C_6H_5$—P—$(OC_6H_5)_2$
(7) $C_6H_5$—P—$(OCH_3)_2$
(8) $C_6H_5$—P—$(OC_2H_5)_2$
(9) $C_6H_5$—P$(OC_4H_9)_2$ (normal)
(10) $CH_3$—P—$(OC_6H_5)_2$
(11)

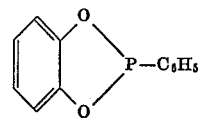

Other suitable ligands (L) according to Formula II include:

(12) $(CH_3)_2$—P—O—$C_6H_5$
(13) $(C_2H_5)_2$—P—O—$C_6H_5$
(14) $(CH_3)_2$—P—O—$CH_3$
(15) $(CH_3)_2$—P—O—$C_2H_5$
(16) $(CH_3)_2$—P—O—$C_4H_9$ (normal)
(17) $(C_2H_5)_2$—P—O—$CH_3$
(18) $(C_2H_5)_2$—P—O—$C_2H_5$
(19) $(C_2H_5)_2$—P—O—$C_4H_9$ (normal)

(20) $(C_6H_5)_2$—P—O—$C_3H_7$ (iso)
(21) $(C_6H_5)_2$—P—O—$CH_2C_6H_5$
(22) $(H_6H_5)_2$—P—O—$CH_2F_3$
(23) $(C_6H_5)_2$—P—O—$CH_2CH_2OCH_3$ (24)

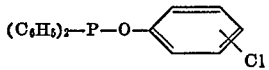

(25)

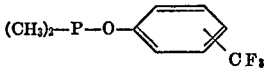

(26)

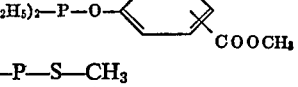

(27) $(C_6H_5)_2$—P—S—$CH_3$
(28) $(C_6H_5)_2$—P—S—$C_2H_5$

Other suitable ligands (L) according to Formula III include:

(29) $C_2H_5$—P—$(OC_6H_5)_2$
(30) $CH_2$—P—$(OCH_3)_2$
(31) $CH_3$—P—$(OC_2H_5)_2$
(32) $CH_3$—P—$(OC_4H_9)_2$ (normal)
(33) $C_2H_5$—P—$(OCH_3)_2$
(34) $C_2H_5$—P—$(OC_2H_5)_2$
(35) $C_2H_5$—P—$(OC_4H_9)_2$ (normal)
(36) $C_6H_5$—P—$(OC_3H_7)_2$ (iso)
(37) $C_6H_5$—P—$(OCH_2C_6H_5)_2$
(38) $C_6H_5$—P—$(OCH_2CF_3)_2$
(39) $C_6H_5$—P—$(OCH_2CH_2OCH_3)_2$

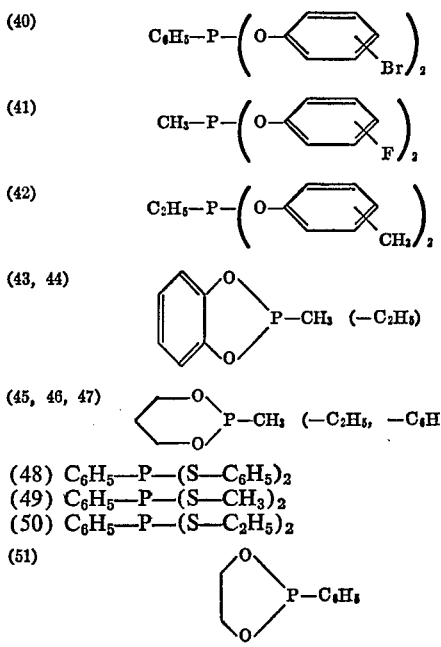

(48) $C_6H_5$—P—$(S—C_6H_5)_2$
(49) $C_6H_5$—P—$(S—CH_3)_2$
(50) $C_6H_5$—P—$(S—C_2H_5)_2$ (51)

Following are some representative values for X and Y. It is noted that only one of X or Y can be hydrogen and when one of X or Y is hydrogen, then the other of X or Y can be any one of the groups set out hereafter. It is preferred that X and Y be chlorine, bromine, or chlorine and bromine. It is also preferred that when only one of X or Y is chlorine or bromine, the other of X or Y is hydrogen. It is most preferred that X and Y both be chlorine. X and Y, which can be the same or different, can also be selected from:

iodine;
alkyl of up to 10 carbon atoms, e.g., methyl, ethyl, n-hexyl, n-decyl, isopropyl, t-butyl, t-octyl;
aryl of up to 12 carbon atoms, e.g., phenyl α- and β-naphthyl and the biphenylyls;
substituted aryl of up to 12 carbon atoms containing up to:

(a) 5 lower alkyl or lower alkoxy groups, e.g., the tolyls, ethylphenyl, the xylyls, mesityl, pentamethylphenyl, anisyls, phenetlys, o-, m- and p-butoxyphenyl;
(b) 5 halogen atoms, e.g., o-, m- and p-chlorophenyl, p-bromophenyl, o-, m- and p-fluorophenyl, perfluorophenyl, perchlorophenyl;
(c) 3 cyano groups, e.g., o-, m- and p-cyanophenyl, 2,4-dicyanophenyl, 3,4-dicyanophenyl;
(d) 3 alkoxycarbonyl groups, e.g., p-ethoxycarbonyl phenyl 2,4-bis(methoxycarbonyl) phenyl, 3,4-bis (methoxycarbonyl) phenyl;
(e) 3 trifluoromethyl groups, e.g., o-, m- and p-trifluoromethylphenyl, 3,4 - bis(trifluoromethyl) phenyl;

cyano, $SnCl_3$, alkanoyl of up to 12 carbon atoms, e.g. o-acetylphenyl, p-hexanoylphenyl, p-dodecanoylphenyl;
aroyl of up to 12 carbon atoms, e.g., benzoyl, o-, m-, and p-toluoyl, p-ethylbenzoyl, p-amylbenzoyl;
azido, isocyanato, tricyanato, lower perfluoroalkyl, e.g., trifluoromethyl, n- and isoperfluoropropyl, perfluoroethyl, perfluorohexyl; and
when X is ≠ to Y, one of X and Y can be hydrogen.

The preferred platinum and palladium starting reactants are platinous and palladous salts, especially dichloro salts. As an alternative to making the novel compounds by the novel process of this invention, it is also possible to make some of them using known chemical reactions but employing other of the novel compounds as starting reactants. For instance, the following procedures are possible.

(a) $L_2MCl_2 + 2I^\ominus \rightarrow L_2MI_2 + 2Cl^\ominus$
(b) $L_2MCl_2 + 2Br^\ominus \rightarrow L_2MBr_2 + 2Cl^\ominus$
(c) $L_2MCl_2 + CH_3MgCl \rightarrow L_2MClCH_3 + MgCl_2$
(d) $L_2M(CH_3)_2 + 2HCN \rightarrow L_2M(CN)_2 + 2CH_4$
(e) $L_2MCl_2 + 2KCN \rightarrow L_2M(CN)_2 + 2KCl$
(f) $L_2MClY + SnCl_2 \rightarrow L_2MSnCl_3Y$ (g) $L_2MY(\text{alkyl or aryl}) + CO \rightarrow L_2MY(\overset{O}{\overset{\|}{C}}-\text{alkyl or aryl})$ References concerning the chemistry of some of the reactions (a) to (g) above are as follows:

(a) and (b) J. M. Jenkins et al., J. Chem. Soc. (A), London, 1966, 770.
(c) G. Calvin et al., J. Chem. Soc., London, 1960, 2008; J. Chatt et al., J. Chem. Soc., London, 1957, 705.
(e) J. C. Bailar, Jr. and H. Itatani, J. Am. Chem. Soc., 89, 1592 (1967);
(f) M. Sakakibara et al., Inorg. Nucl. Chem. Letters, 5, 427 (1969);
(g) G. Booth et al., J. Chem. Soc. (A) 1966, 634.

Complexes of the type $L_2MHCl$ can be prepared as described in J. C. Bailar, Jr. and H. Itatani, Inorg. Chem., 4, 1618 (1965), J. Chatt and B. L. Shaw, J. Chem. Soc. 1962, 5075, H. Munakata and M. L. H. Green, Chem. Comm., 1970, 881, and E. H. Brooks and F. Glockling, J. Chem. Soc. 1967 (A), 1030.

DESCRIPTION OF THE PREFERRED EMBODIMENTS

The following examples are meant to illustrate but not to limit the invention.

Example 1

[$C_6H_5P(OCH_2CH_3)_2$]$_2PtCl_2$

A solution of 1.11 g. of diethyl phenylphosphonate in 10 ml. of dichloromethane was added to a suspension of 1.0 g. of dichloro(norbornadiene)platinum(II) in 10 ml. of dichloromethane. The mixture was stirred for 1 hour, filtered, and the filtrate was evaporated under vacuum to give 1.63 g. of white, crystalline residue. The residue was dissolved in 40 ml. of hot benzene, filtered, and 5 ml. of n-hexane was added. Cooling overnight gave 1.3 g. of dichlorobis(diethyl phenylphosphonate)platinum(II) as white needles, M.P. 169–171° C.

*Analysis.*—Calcd. for $C_{20}H_{30}Cl_2O_4P_2Pt$ (percent): C, 36.26; H, 4.56; Cl, 10.71. Found (percent): C, 36.04; H, 4.66; Cl, 10.28.

Example 2

[($C_6H_5$)$_2$P—OCH$_2$CH$_3$]$_2$PtCl$_2$

A solution of 1.29 g. of ethyl diphenylphosphinate in 10 ml. of dichloromethane was added to a suspension of 1.0 g. of dichloro(norbornadiene)platinum(II) in 10 ml. of dichloromethane. The mixture was stirred for 1 hour and evaporated under vacuum. The white, solid residue was dissolved in 25 ml. of dichloromethane, filtered, and 100 ml. of n-hexane was added. The white precipitate was filtered, washed with hexane, and dried to give 1.78 g. of dichloro-bis(ethyl diphenylphosphinite) platinum(II), M.P. 227–230° C.

*Analysis.*—Calcd. for $C_{28}H_{30}Cl_2O_2P_2Pt$ (percent): C, 46.30; H, 4.16. Found (percent): C, 45.84; H, 4.39.

Example 3

[$C_6H_5P(OCH_3)_2$]PtCl$_2$

A solution of 1.95 g. of dimethyl phenylphosphonite in 20 ml. of dichloromethane was added to a suspension of 2.0 g. of dichloro(norbornadiene) platinum(II) in 20 ml. of dichloromethane. The mixture was stirred for 1 hour and evaporated under vacuum to give 3.33 g. (99% yield) of dichlorobis(dimethyl phenylphosphonite) platinum(II) as white crystals, M.P. 180–183° C.

*Analysis.*—Calcd. for $C_{16}H_{22}Cl_2O_4P_2Pt$ (percent): C, 31.69; H, 3.66. Found (percent): C, 32.18; H, 3.67.

Example 4

[($C_6H_5$)$_2$P—OCH$_3$]$_2$PtCl$_2$

A solution of 2.5 g. of methyl diphenylphosphinite in 20 ml. of dichloromethane was added to a suspension of 2.0 g. of dichloro(norbornadiene)platinum(II) in 20 ml. of dichloromethane. The mixture was stirred for 1 hour and evaporated under vacuum. The residue was washed with n-hexane and dried to give 3.52 g. of dichlorobis (methyl diphenylphosphinite)platinum(II) as a white solid, dec. 300° C.

*Analysis.*—Calcd. for $C_{26}H_{26}Cl_2O_2P_2Pt$ (percent): C, 44.72; H, 3.75. Found (percent): C, 45.03; H, 3.80.

Example 5

[$C_6H_5P(OCH_3)_2$]$_2$PdCl$_2$

A 1.25 g. portion of dimethyl phenylphosphonite was added to a filtered solution of 1.0 g. of dichlorobis(benzonitrile)palladium(II) in 75 ml. of benzene. After standing for 10 minutes, the white solid was filtered, washed with benzene and hexane, and dried to give 1.19 g. of dichlorobis(dimethyl phenylphosphonite)palladium(II), dec. 150° C.

*Analysis.*—Calcd. for $C_{16}H_{22}Cl_2O_4P_2Pd$ (percent): C, 37.13; H, 4.29; P, 11.96. Found (percent): C, 37.49; H, 4.32; P, 11.85.

Example 6

[($C_6H_5$)$_2$P—OC$_6H_5$]$_2$PdCl$_2$

A 6.0-g. portion of phenyl diphenylphosphinite was added to a filtered solution of 3.0 g. of dichlorobis(benzonitrile)palladium(II) in 225 ml. of benzene. The mixture was stirred for 1 hour, and the precipitate was filtered, washed with benzene and hexane, and dried to give 5.6 g. of solid. Recrystallization from 150 ml. of chlorobenzene gave 4.71 g. of dichlorobis(phenyl diphenylphosphinite) palladium(II) as pale-yellow crystals, dec. 195° C., with M.P. 218–222° C.

*Analysis.*—Calcd. for $C_{36}H_{30}Cl_2O_2P_2Pd$ (percent): C, 58.92; H, 4.12. Found (percent): C, 58.96; H, 4.14.

Example 7

[$C_6H_5P(OC_6H_5)_2$]$_2$PdCl$_2$

A 6.3-g. portion of diphenyl phenylphosphonite was added to a filtered solution of 3.0 g. of dichlorobis(benzonitrile)palladium(II) in 225 ml. of benzene. The mixture was stirred for 1 hour, and the white solid was filtered, washed with benzene and hexane, and dried to give 6.32 g. of crude product. Recrystallization from 200 ml. of chlorobenzene gave 5.83 g. of dichlorobis(diphenyl phenylphosphonite)palladium(II) as white crystals, M.P. 232–238° C. dec.

*Analysis.*—Calcd. for $C_{36}H_{30}Cl_2O_4P_2Pd$ (percent): C, 56.46; H, 3.94; Cl, 9.26. Found (percent): C, 56.35; H 3.91; Cl, 9.17.

Example 8

[$C_6H_5P(OCH_2CH_3)_2$]$_2$PdCl$_2$

A 4.3 g-portion of diethyl phenylphosphonite was added to a filtered solution of 3.0 g. of dichlorobis(benzonitrile)palladium(II) in 250 ml. of benzene. The mixture was stirred for 1 hour, heated to boiling, filtered, and the filtrate was cooled to give 1.15 g. of dichlorobis(diethyl phenylphosphonite)palladium(II) as ivory crystals, dec. 150° C., with M.P. 163–165° C.

*Analysis.*—Calcd. for $C_{20}H_{30}Cl_2O_4P_2Pd$ (percent): C 41.87; H, 5.26. Found (percent): C, 41.90; H, 5.13.

Example 9

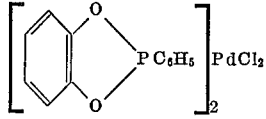

A 3.1-g. portion of 2-phenyl-1,3,2-benzodioxaphosphole was added to a filtered solution of 2.0 g. of dichlorobis(benzonitrile)palladium(II) in 150 ml. of benzene. The mixture was stirred for 1 hour, and 100 ml. of n-hexane was added. The solid was then filtered, washed with hexane and dried to give 2.47 g. of dichlorobis(2-phenyl-1,3,2-benzodioxaphosphole)palladium(II) as an orange-yellow solid, dec. 120° C., as M.P. 151–158° C.

*Analysis.*—Calcd. for $C_{24}H_{18}Cl_2O_4P_2Pd$ (percent): C, 47.29; H, 2.97. Found (percent): C, 47.22; H, 3.26.

Example 10

[($C_6H_5$)$_2$P—OEt]$_2$PdCl$_2$

A 3.4-g. portion of ethyl diphenylphosphinite was added to a filtered solution of 2.0 g. of dichlorobis(benzonitrile)palladium(II) in 150 ml. of benzene. The mixture was stirred for 1 hour, and the white solid was filtered and recrystallized from benzene/dichloromethane to give 2.45 g. of dichlorobis(ethyl diphenylphosphonite)palladium(II) as white crystals, dec. 185° C.

*Analysis.*—Calcd. for $C_{28}H_{30}Cl_2O_2P_2Pd$ (percent): C, 52.73; H, 4.74. Found (percent): C, 52.75; H, 4.79.

Example 11

[($C_6H_5$)$_2$P—SC$_6H_5$]$_2$PdCl$_2$

A 8.4-g. portion of phenyl diphenylthiophosphinite was added to a filtered solution of 4.0 g. of dichlorobis(benzonitrile)palladium(II) in 300 ml. of benzene. The mixture was stirred for 18 hours, and the orange-yellow solid was filtered and washed with benzene and hexane to give 6 g. of dichlorobis(phenyl diphenylthiophosphinite)palladium(II), dec. 205–210° C.

*Analysis.*—Calcd. for $C_{36}H_{30}Cl_2P_2PdS_2$ (percent): C, 56.45; H, 3.94; P, 8.09; Cl, 9.26. Found (percent): C, 56.42; H, 4.01; P, 7.83; Cl, 9.04.

Example 12

[($C_6H_5$)$_2$P—OCH$_3$]$_2$PdCl$_2$

A 9.3-g. portion of methyl diphenylphosphinite was added dropwise to a filtered solution of 6.0 g. of dichlorobis(benzonitrile)palladium(II) in 650 ml. of benzene. The mixture was stirred for 1 hour, and the creamy-white solid was filtered and washed with benzene and ether. Recrystallization of the solid from 300 ml. of chlorobenzene gave 6.0 g. of dichlorobis(methyl diphenylphosphinite) palladium(II) as pale-yellow crystals, dec. 185° C., with M.P. 198–210° C.

*Analysis.*—Calcd. for $C_{26}H_{26}Cl_2O_2P_2Pd$ (percent): C, 51.21; H, 4.30; P, 10.17; Cl, 11.63. Found (percent): C, 50.60; H, 4.23; P, 10.29; Cl, 12.37.

Example 13

$[(C_6H_5)_2P\text{—}OCH_3]_2PdCl_2$

A mixture of 10 g. of palladium chloride, 300 ml. of acetonitrile, and 25 g. of methyl diphenylphosphinite was stirred for 18 hours under nitrogen. The resulting creamy-white solid was filtered, washed with acetonitrile and ether, and recrystallized from 800 ml. of chlorobenzene to give 20.2 g. of dichlorobis(methyl diphenylphosphinite)-palladium(II) as pale yellow crystals identical to those obtained in Example 12.

*Analysis.*—Calcd. for $C_{26}H_{26}Cl_2O_2P_2Pd$ (percent): C, 51.21; H, 4.30. Found (percent): C, 51.49; H, 4.36.

Example 14

$[CH_3P(OC_6H_5)_2]_2PtCl_2$

A 5.0-g. portion of diphenyl methylphosphonite was added to a suspension of 3.8 g. of dichloro(norbornadiene)-platinum(II) in 75 ml. of dichloromethane under nitrogen. The mixture was stirred for 10 minutes, filtered, and the filtrate was evaporated under vacuum to give 7.15 g. of white solid which was recrystallized from 100 ml. of hot benzene to give 6.2 g. of dichlorobis(diphenyl methylphosphonite)platinum(II) as a white, crystalline solid, M.P. 157–159° C.

*Analysis.*—Calcd. for $C_{26}H_{26}Cl_2O_4P_2Pt$ (percent): C, 42.75; H, 3.58. Found (percent): C, 42.41; H, 3.35.

Example 15

$[(C_6H_5)_2P\text{—}OCH_3]_2PdBr_2$

A mixture of 1.0 g. of lithium bromide, 1.83 g. of dichlorobis(methyl diphenylphosphinite)palladium(II), and 50 ml. of acetone was heated to a boil with stirring, and then stirred at room tempertaure for 16 hr. The original pale-yellow starting material reaction to give a deep yellow product which was filtered, washed with acetone and methanol, and dried at 80°/0.1 mm. for 16 hr. to give 1.87 g. of dibromobis(methyl diphenylphosphinite)palladium(II), dec. 194–198°.

*Analysis.*—Calcd. for $C_{26}H_{26}Br_2O_2P_2Pd$ (percent): C, 44.69; H, 3.75. Found (percent): C, 45.76; H, 3.75.

UTILITY

The novel compounds of this invention are useful alone or with halide promoters as catalysts for the alkoxycarbonylation of olefins. Carbonylation reactions have been found to proceed very well without the need for separate halogen-containing reaction promoters. Examples A, B, C and D, below, are representative of some carbonylation reactions wherein reaction promoters are not employed.

The novel compounds are also useful in the polymerization of acetylene. See Examples E and F below for two representative polymerization reactions, one employing a novel palladium compound and the other a novel platinum compound as the polymerization catalyst.

Example A.—Carbomethoxylation of ethylene with $[C_6H_5P(OCH_3)_2]_2PtCl_2$ catalyst A mixture of 0.12 g. of dichlorobis(dimethyl phenylphosphonite)platinum(II), 10 ml. of methanol, and 2 g. of ethylene was heated slowly to 200° under 1000 atm. of carbon monoxide. A gas-liquid partition chromatographic (GLPC) analysis of the resulting mixture showed the formation of methyl propionate as the main product.

Example B

Example A was repeated except for the use of $[(C_6H_5)_2P\text{—}OC_6H_5]_2PdCl_2$ as catalyst. Methyl propionate was the main product.

Example C.—Carbomethoxylation of 1-hexene with $(Ph_2POMe)_2PdCl_2$ catalyst

A mixture of 20 g. of 1-hexene, 20 g. of methanol, and 0.61 g. of dichlorobis(methyl diphenylphosphinite)-palladium(II) was heated in a shaker tube at 90° and 700 atm. of carbon monoxide for 10 hr. A GLPC analysis of the resulting mixture showed a 30% conversion of 1-hexene to a mixture of esters containing 62% of the linear ester, methyl n-heptanoate and 38% of the branched ester methyl α - methyl - n - hexanoate. Distillation gave 8.1 g. of esters.

Example D.—Carboethoxylation of cyclooctene with $[(C_6H_5)_2P\text{—}OCH_2CH_3]_2PdCl_2$ catalyst A mixture of 20 g. of cyclooctene, 20 ml. of ethanol, and 0.7 g. of dichlorobis(ethyl diphenylphosphinite) palladium(II) was heated in a shaker tube at 90° and 700 atm. of carbon monoxide for 10 hr. A GLPC analysis of the resulting mixture showed a 97% conversion of cyclooctene to ethyl cyclooctane-carboxylate as the only product.

Example E.—Polymerization of acetylene with $[C_6H_5P(OCH_3)_2]_2PtCl_2$ catalyst A mixture of 0.12 g. of dichlorobis(dimethyl phenylphosphonite)platinum(II), 10 ml. of toluene, and 2 g. of acetylene was heated slowly in a shaker tube to 200° over a 12 hr. period. Polyacetylene, identified by its infrared spectrum, was formed as a brown solid insoluble in toluene.

Example F

Example E was repeated except that $[(C_6H_5)_2P\text{—}OC_6H_5]_2PdCl_2$ was employed as catalyst. Polyacetylene was produced.

The embodiments of the invention in which an exclusive property or privilege is claimed are defined as follows:

1. A compound of the formula $(L)_2MXY$ wherein:

L is selected from one of $$\begin{array}{c} R^1 \\ \diagdown \\ R^2 \end{array} P\text{—}Z\text{—}R^3 \text{ and } R^1\text{—}P \begin{array}{c} Z\text{—}R^4 \\ \diagup \\ \diagdown \\ Z\text{—}R^5 \end{array}$$

M is Pd or Pt; and

X and Y are alike or different and are chlorine, bromine, iodine, alkyl up to 5 carbons, cyano, $SnCl_3$, alkanoyl of 2–5 carbons, or aroyl of up to 12 carbons with the proviso that one of X and Y can be hydrogen, $R^1$, $R^2$, $R^3$, $R^4$, and $R^5$ are selected from linear or branched alkyls of up to 10 carbon atoms, aryl of up to 12 carbon atoms, aryl of up to 12 carbon atoms substituted with up to 5 lower alkyl or lower alkoxy groups, each containing up to 4 carbon atoms, up to 5 halogen atoms, up to 3 cyano groups, up to 3 alkoxycarbonyl or up to 3 trifluoromethyl groups, aralkyl of up to 12 carbon atoms, and alkaryl of up to 12 carbon atoms, $R^4$ and $R^5$ taken together can be O-arylene or $(CH_2)_n$ where $n=2$ or 3.

2. A compound according to claim 1, wherein $X \neq Y$ and one of X or Y is hydrogen and the other of X or Y is chlorine or bromine.

3. A compound according to claim 1, wherein X=Y= chlorine or bromine.

4. A compound according to claim 3, wherein X=Y= bromine.

5. A compound according to claim 4, dibromobis(methyl diphenyl phosphinite)palladium(II).

6. A compound according to claim 3, wherein X=Y= chlorine.

7. A compound according to claim 6, dichlorobis-(diethyl phenylphosphonite)platinum(II).

8. A compound according to claim 6, dichlorobis-(ethyl diphenylphosphinite)platinum(II).

9. A compound according to claim 6, dichlorobis-(dimethyl phenyl phosphonite)platinum(II).

10. A compound according to claim 6, dichlorobis-(methyl diphenylphosphinite)platinum(II).

11. A compound according to claim 6, dichlorobis-(dimethyl phenylphosphonite)palladium(II).

12. A compound according to claim 6, dichlorobis-(phenyl diphenylphosphinite)palladium(II).

13. A compound according to claim 6, dichlorobis-(diphenyl phenylphosphonite)palladium(II).

14. A compound according to claim 6, dichlorobis-(diethyl phenylphosphonite)palladium(II).

15. A compound according to claim 6, dichlorobis-(2-phenyl-1,3,2-benzodioxaphosphole)palladium(II).

16. A compound according to claim 6, dichlorobis-(ethyl diphenylphosphinite)palladium(II).

17. A compound according to claim 6, dichlorobis-(phenyl diphenylthiophosphinite)palladium(II).

18. A compound according to claim 6, dichlorobis-(methyl diphenylphosphinite)palladium(II).

19. A compound according to claim 6, dichlorobis-(diphenyl methylphosphonite)platinum(II).

20. A process for making the compounds of claim 1 comprising reacting a source of MXY, selected from the group (1) MXY itself, (2) $Z^1_2$MXY and (3) $Z^2$MXY with two or more equivalents of L, wherein L, M, X and Y are as defined in claim 1, $Z^1$ is a monodentate labile ligand and $Z^2$ is a bidentate labile ligand.

References Cited

UNITED STATES PATENTS

| | | | |
|---|---|---|---|
| 3,284,354 | 11/1966 | Tunkel et al. | 260—429 R X |
| 3,293,208 | 12/1966 | Micionis et al. | 260—429 R X |
| 3,422,079 | 1/1969 | Welch et al. | 260—429 R X |
| 3,428,662 | 2/1969 | Millendorf et al. | 260—429 R X |

DANIEL E. WYMAN, Primary Examiner

P. F. SHAVER, Assistant Examiner

U.S. Cl. X.R.

252—431 P; 260—80 C, 349, 468 R, 468 CB, 478, 497 R, 695